United States Patent
Nakajima

Patent Number: 6,061,642
Date of Patent: May 9, 2000

[54] INITIAL CORRECTION FACTOR DETERMINING DEVICE AND DEVICE UTILIZING THE SAME FOR VEHICLE

[75] Inventor: Mikao Nakajima, Osaka, Japan

[73] Assignees: Sumitomo Electric Industries, Ltd., Osaka; Sumitomo Rubber Industries, Ltd., Hyogo, both of Japan

[21] Appl. No.: 08/952,753

[22] PCT Filed: Mar. 13, 1997

[86] PCT No.: PCT/JP97/00791

§ 371 Date: Nov. 13, 1997

§ 102(e) Date: Nov. 13, 1997

[87] PCT Pub. No.: WO97/34152

PCT Pub. Date: Sep. 18, 1997

[30] Foreign Application Priority Data

Mar. 14, 1996 [JP] Japan .................................... 8-058039

[51] Int. Cl.$^7$ ...................................................... G01P 3/56
[52] U.S. Cl. .............................. 702/105; 701/71; 701/78; 701/70
[58] Field of Search .............................. 702/105, 34, 141, 702/157; 701/74–90, 92; 303/122, 133, 128, 173, 168, 165; 180/197

[56] References Cited

U.S. PATENT DOCUMENTS

| | | |
|---|---|---|
| 5,299,131 | 3/1994 | Haas et al. . |
| 5,453,942 | 9/1995 | Wood et al. ............................. 702/148 |
| 5,490,070 | 2/1996 | Kiryu et al. ............................. 701/70 |

FOREIGN PATENT DOCUMENTS

| | | |
|---|---|---|
| 0 510 466 A1 | 10/1992 | European Pat. Off. . |
| 0 553 825 | 4/1993 | European Pat. Off. . |
| 0 652 121 | 5/1995 | European Pat. Off. . |
| 62-74008 | 5/1987 | Japan . |
| 63-305011 | 12/1988 | Japan . |
| 1-295167 | 11/1989 | Japan . |
| 4-212609 | 8/1992 | Japan . |
| 4-271907 | 9/1992 | Japan . |
| 07-164842 | 6/1995 | Japan . |
| 7-218519 | 8/1995 | Japan . |
| 7-260810 | 10/1995 | Japan . |

OTHER PUBLICATIONS

Helmut Mayer; "Comparative Diagnosis Of Tyre Pressures"; *Institute For Industrial Information Systems*; pp. 627–632 vol. 1; Aug. 24, 1994.

*Primary Examiner*—Kamini Shah
*Attorney, Agent, or Firm*—Rabin & Champagne, P.C.

[57] ABSTRACT

A device for determining a correction factor for correcting an output of a rotational velocity mechanism for detecting the rotational velocity of a tire mounted on a vehicle, and a slip factor calculating device and a tire pressure drop detecting device utilizing the determining device. The rotational velocity of the tire is detected in response to the fact that an initializing switch is operated at the time of trial linear coasting. An initial correction factor is found on the basis of the rotational velocity. The initial correction factor is stored in an E$^2$PROM. At a time of normal traveling, the rotational velocity is initially corrected on the basis of the initial correction factor (S2). Further, the slip factor is calculated on the basis of the rotational velocity after the initial correction (S3). A judged value required to detect the drop in air pressure in the tire is corrected on the basis of the slip factor or the like (S9). The initial correction factor representing only a relative difference in effective rolling radius between tires can be acquired, so that an initial difference can be eliminated from the rotational velocity with high precision.

9 Claims, 9 Drawing Sheets

F I G. 1
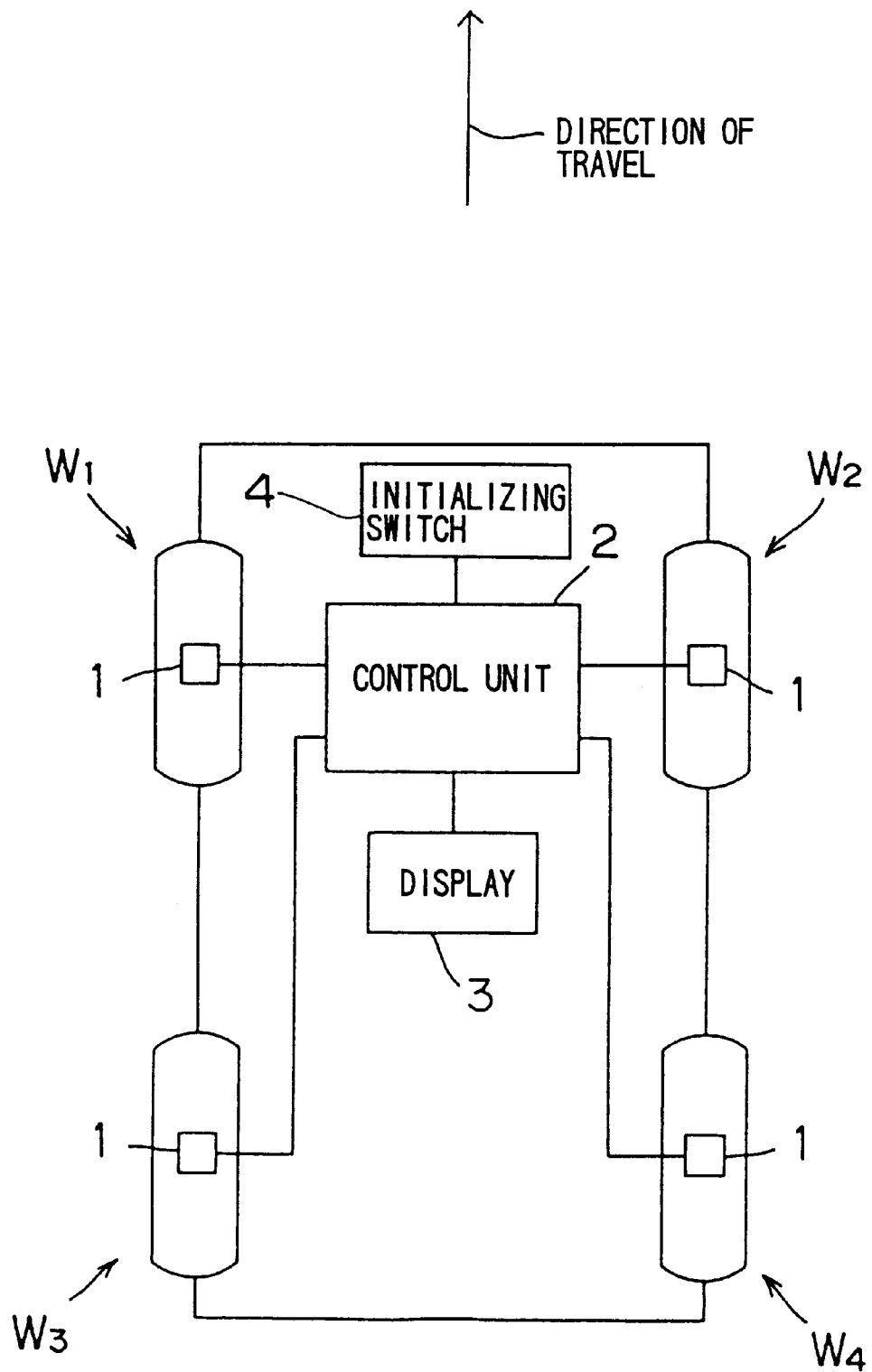

F I G. 4
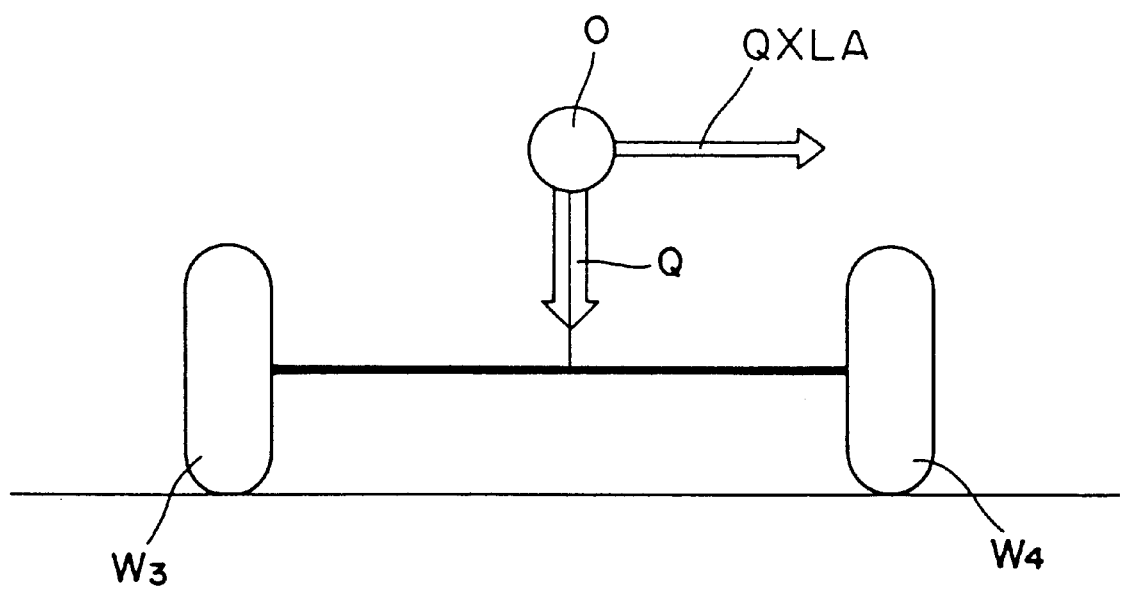

INITIAL CORRECTION FACTOR DETERMINING DEVICE AND DEVICE UTILIZING THE SAME FOR VEHICLE

BACKGROUND OF THE INVENTION

1. Field of the Invention

The present invention relates generally to an initial correction factor determining device applied to detection of the drop in air pressure of a tire, for example, for finding an initial correction factor for eliminating the effect of a relative difference in effective rolling radius, depending on an initial difference between tires, on the rotational velocity. Further, it relates to a slip factor calculating device applied to detection of a drop in air pressure of a tire, for example, for calculating the slip factor of a driving tire. Furthermore, it relates to a tire pressure drop detecting device for detecting a drop in air pressure of a tire utilizing the rotational velocity corrected using the initial correction factor found by the initial correction factor determining device.

2. Background Art

In recent years, as an example of a safety device of a four-wheel vehicle such as an automobile or a truck, devices for detecting a drop in air pressure of a tire have been developed, and some of them have been put to practical use.

An example of a method of detecting a drop in air pressure of a tire is a method utilizing the differences among the respective rotational velocities $F_1$, $F_2$, $F_3$, and $F_4$ of four tires $W_1$, $W_2$, $W_3$, and $W_4$ mounted on a vehicle. The tires $W_1$ and $W_2$ are right and left front tires. The tires $W_3$ and $W_4$ are right and left rear tires.

In this detecting method, the rotational velocity $F_i$ of each of the tires $W_i$ (i=1, 2, 3, 4) is detected for each predetermined sampling period on the basis of a signal outputted from a wheel speed sensor associated with the tire $W_i$.

The detected rotational velocities $F_i$ are equal if all of the effective rolling radii of the respective tires $W_i$ are the same, and the vehicle is traveling linearly. The effective rolling radius is the distance the tire $W_i$ freely rolling in a loaded state (rolling in a state where both the slip angle and the slip factor are zero) moves by one rotation divided by $2\pi$.

On the other hand, the effective rolling radius of each of the tires $W_i$ changes with changes in air pressure in the tire $W_i$, for example. That is, when the air pressure in the tire $W_i$ drops, the effective rolling radius thereof is smaller than that at a time of normal internal pressure. Consequently, the rotational velocity $F_i$ of the tire $W_i$ whose air pressure drops is higher than that at a time of normal internal pressure. Therefore, the reduced pressure of the tire $W_i$ can be judged on the basis of differences among the rotational velocities $F_i$.

An equation used in detecting the drop in air pressure in the tire $W_i$ on the basis of differences among the rotational velocities $F_i$ is the following equation (1), for example (see Japanese Patent Laid-Open (KOKAI) No. 305011/1988, Japanese Patent Laid-Open (KOKAI) No. 212609/1992, etc.).

$$D = \frac{\frac{F_1+F_4}{2} - \frac{F_2+F_3}{2}}{\frac{F_1+F_2+F_3+F_4}{4}} \times 100 \quad (1)$$

If the effective rolling radii of the tires $W_i$ are the same, the respective rotational velocities $F_i$ are the same ($F_1=F_2=F_3=F_4$). Consequently, the judged value D is zero. Therefore, threshold values $D_{TH1}$ and $D_{TH2}$ (where $D_{TH1}$, $D_{TH2}>0$) are set. When conditions indicated by the following expression (2) are satisfied, it is judged that there is a tire $W_i$ whose air pressure has dropped. When the conditions are not satisfied, it is judged that all the tires $W_i$ have normal internal pressure:

$$D < -D_{TH1} \text{ or } D > D_{TH2} \quad (2)$$

The effective rolling radii of the actual tires $W_i$ include variations within the production standard occurring at the time of fabricating the tires $W_i$ (hereinafter referred to as an "an initial difference"). That is, even if the four tires $W_i$ have normal internal pressure, the effective rolling radii of the four tires $W_i$ differ due to the initial difference. Correspondingly, the rotational velocities $F_i$ of the tires $W_i$ vary. As a result, the judged value D may be a value other than zero. Therefore, it is erroneously detected that the air pressure has dropped, although it has not dropped. In order to detect the drop in air pressure with high precision, therefore, it is necessary to eliminate the effect of the initial difference from the detected rotational velocity $F_i$.

It is considered that as a technique for eliminating the effect of the initial difference from the rotational velocity $F_i$, a technique disclosed in Japanese Patent Laid-Open (KOKAI) No. 271907/1992, for example, is applied. In the technique disclosed in this gazette, a vehicle is caused to travel linearly on a path at a predetermined speed, and any one of the rotational velocities $F_i$ of the tires $W_i$ detected at that time is used as a basis to find correction factors $K_i$. When the rotational velocity $F_1$ of the tire $W_1$ is used as a basis, the correction factors $K_i$ are found by the following equations (3) to (6):

$$K_1 = F_1/F_1 \quad (3)$$

$$K_2 = F_1/F_2 \quad (4)$$

$$K_3 = F_1/F_3 \quad (5)$$

$$K_4 = F_1/F_4 \quad (6)$$

The rotational velocities $F_i$ detected at the time of normal traveling are respectively multiplexed by the correction factors $K_i$. Consequently, the effect of the initial difference on the rotational velocity $F_i$ is eliminated to some extent.

When the vehicle is a front engine front drive vehicle (FF vehicle) or a front engine rear drive vehicle (FR vehicle), each of the correction factors $K_3$ and $K_4$ expressed by the foregoing equations (5) and (6) is the ratio of the rotational velocities of a driving tire and a following tire.

On the other hand, driving torque or braking torque (hereinafter abbreviated to as "driving/braking torque") is applied to the driving tire at the time of traveling. The torque may cause the driving tire to slip. Therefore, the rotational velocity $F_i$ of the driving tire is generally expressed by the following equation (7). In the following equation (7), Rs is the slip factor, V is the speed of the vehicle, and $r_i$ is the effective rolling radius of the tire $W_i$:

$$F_i = \frac{V}{2\pi r_i}(1+Rs) \quad (7)$$

In the case of the FF vehicle, the tires $W_1$ and $W_2$ are driving tires, and the tires $W_3$ and $W_4$ are following tires, whereby the correction factor $K_3$ can be expressed by the following equation (8) from the foregoing equations (5) and (7):

$$K_3 = \frac{F_1}{F_3} = \frac{\frac{V(1+Rs)}{2\pi r_1}}{\frac{V}{2\pi r_3}} = \frac{r3(1+Rs)}{r1} \qquad (8)$$

The effect of the slip factor Rs is exerted on the correction factor $K_3$ expressed by the ratio of the rotational velocities of the driving tire and the following tire. The same is true to the correction factor $K_4$.

More specifically, the slip factor Rs is expressed by the following equation (9) until the tire $W_i$ reaches the grip limit:

$$Rs = \frac{1}{\mu} \times \frac{2T}{C_x \times W_D \times L^2} \qquad (9)$$

In the equation (9), $\mu$ is the coefficient of friction of a road surface, $C_X$ is the shear modulus of the tire $W_i$, $W_D$ is the width of a grounding area, L is the length of the grounding area, and T is a driving/braking force. The driving/braking force T is approximately proportional to the square of the speed V of the vehicle at the time of constant-speed traveling.

Consequently, the correction factors $K_3$ and $K_4$ include the effects of the coefficient of friction $\mu$ of the road surface and the speed V of the vehicle at the time of a trial. At a time of actual (normal, not a trial) travel, however, the vehicle travels on road surfaces having various coefficients of friction $\mu$ at various speeds V. Even if the rotational velocities $F_i$ are corrected using the correction factors $K_3$ and $K_4$ found at a time of trial traveling, therefore, the rotational velocities cannot be accurately corrected. Accordingly, it is difficult to eliminate the effect of the initial difference from the rotational velocity $F_i$ with high precision.

When the vehicle travels around a corner or a curve (hereinafter represented by a "corner"), lateral acceleration is exerted on the vehicle. As a result, the load exerted on the vehicle is toward the outside of the corner. Consequently, the effective rolling radius of the tire $W_i$ on the inside of (facing) the corner is increased, and the ground contact area thereof is relatively decreased. On the other hand, the effective rolling radius of the tire $W_i$ on the outside of (facing away from) the corner is decreased, and the ground contact area thereof is relatively increased.

On the other hand, a driving force produced by the engine is almost equally applied to the tire $W_i$ on the inside of the corner and the tire $W_i$ on the outside of the corner by a differential gear. As a result, variations arise in the slip factor Rs between the tire $W_i$ on the inside of the corner and the tire $W_i$ on the outside of the corner. Therefore, variations arise in the rotational velocity $F_i$ between the tire $W_i$ on the inside of the corner and the tire $W_i$ on the outside of the corner.

Even if all the tires $W_i$ have normal internal pressure, therefore, the variations in the rotational velocity $F_i$ are created by the variations in the slip factor Rs at the time of cornering. As a result, the judged value D includes an error corresponding to the variations in the slip factor Rs, whereby the reduced pressure may not be accurately judged. In order to judge the reduced pressure with high precision, therefore, the effect of the slip factor Rs must be eliminated.

In order to eliminate the effect of the slip factor Rs, it is considered that a technique proposed in Japanese Patent Application No. 6-312123 previously filed by the present applicant is applied. In the proposed technique, the judged value D is corrected in the following manner.

A variation component $\Delta D$ of the judged value D due to the variations in the slip factor Rs is proportional to a variation component $\Delta Rs$ of the slip factor Rs. On the other hand, the variation component $\Delta Rs$ of the slip factor Rs is proportional to lateral acceleration LA applied to the vehicle, and is inversely proportional to the turning radius R.

The slip factor Rs shall be defined by the following equation (10) until the tire $W_i$ reaches the grip limit:

$$Rs = \frac{2T}{C_x \times W_D \times L^2} \qquad (10)$$

Furthermore, the driving/braking force T shall be proportional to the square of the speed V of the vehicle and front/rear acceleration FRA applied to the vehicle.

The variation component $\Delta D$ of the judged value D can be expressed by the following equation (11) on the basis of the foregoing relationship, letting $\alpha 1$, $\alpha 2$ and $\alpha 3$ be proportional constants:

$$\Delta D = \frac{LA \times (\alpha 1 + \alpha 2 \times V^2 + \alpha 3 \times FRA)}{|R|} \qquad (11)$$

The variation component $\Delta D$ expressed by the equation (11) is taken as a correction factor, and the correction factor is subtracted from the judged value D found by the foregoing equation (1). Consequently, the effect of the slip factor Rs on the judged value D is eliminated.

In the proposed technique, the slip factor Rs is utilized upon being defined by the foregoing equation (10). However, the slip factor Rs is actually inversely proportional to the coefficient of friction $\mu$ of the road surface, as expressed by the foregoing equation (9). In the proposed technique, therefore, there are possibilities that the judged value D after the correction has a large error depending on the state of the road surface, and the effect of the slip factor Rs cannot necessarily be accurately eliminated from the judged value D.

In the above-mentioned proposed technique, the relationship between the amount of variation in the effective rolling radius of each of the front tires $W_1$ and $W_2$ and the amount of variation in the effective rolling radius of each of the rear tires $W_3$ and $W_4$ out of the variations in the effective rolling radii of the tires Wi due to load movement at the time of cornering, is not considered. This is based on the presumption that the amount of variation in the effective rolling radius of each of the front tires $W_1$ and $W_2$ and the amount of variation in the effective rolling radius of each of the rear tires $W_3$ and $W_4$ are the same.

However, the front axle weight and the rear axle weight actually differ from each other. The front axle weight is the load exerted on the front axle on which the front tires are mounted. The rear axle is the load exerted on the rear axle on which the rear tires are mounted. For example, when the engine is set on the front side of the vehicle, the front axle weight is heavier than the rear axle weight.

Therefore, the amount of the load movement on the front tire side and the amount of the load movement on the rear tire side at the time of cornering differ from each other. This is particularly significant in the case of an FF vehicle. As a result, the amount of the variation in the effective rolling radius of a front tire and the amount of the variation in the effective rolling radius of a rear tire, differ from each other.

In order to correct the judged value D with high precision, therefore, the difference in the amount of the load movement between a front tire and a rear tire at the time of cornering must be considered.

OBJECTS AND SUMMARY OF THE INVENTION

An object of the present invention is to solve the above-mentioned technical problem and to provide an initial correction factor determining device capable of finding an initial correction factor faithfully representing only a relative difference in effective rolling radius between tires without depending on the state of a road surface.

Another object of the present invention is to provide a tire pressure drop detecting device realizing correction for eliminating the effect of the slip factor from a judged value with high precision, and therefore capable of detecting the drop in air pressure of a tire with high precision.

Still another object of the present invention is to provide a tire pressure drop detecting device realizing correction considering the difference between the amounts of load movement on the front tire side and the rear tire side at a time of cornering, and therefore capable of detecting the drop in air pressure of a tire with high precision.

An initial correction factor determining device according to the present invention is a device for determining a correction factor for correcting an output of rotational velocity detecting means for detecting the rotational velocity of a tire mounted on a vehicle, and which is characterized by comprising means for accepting the output of the rotational velocity detecting means in a case where the vehicle is linearly coasting, and means for finding an initial correction factor for eliminating the effect on the rotational velocity of a relative difference in effective rolling radius, depending on an initial difference between tires, on the basis of the accepted output of the rotational velocity detecting means.

In this construction, the initial correction factor is found on the basis of the rotational velocity of the tire detected when the vehicle is linearly coasting. At the time of linear coasting, no driving/braking torque is applied to a driving tires. That is, the slip factor of a driving tire can be considered to be zero. Consequently, the effect of the slip factor is not exerted on the found initial correction factor, whereby the initial correction factor can be found as a value faithfully representing the relative difference in effective rolling radius between the tires. If the initial correction factor found in this construction is used in correcting the rotational velocity, the effect of the initial difference can be eliminated from the rotational velocity with high precision irrespective of the coefficient of friction of the road on which the vehicle is traveling.

According to the present invention, the initial correction factor is thus found on the basis of the rotational velocity detected at the time of linear coasting, on which rotational velocity the effect of the slip factor is hardly exerted. Consequently, it is possible to find the initial correction factor faithfully representing the relative difference in effective rolling radius between the tires. Therefore, the effect of the initial difference can be eliminated with high precision from the detected rotational velocity on the basis of the initial correction factor.

Therefore, if the present invention is applied to a tire pressure drop detecting device, for example, it is possible to prevent the initial difference from affecting detection of the drop in air pressure in the tire. As a result, it is possible to detect the drop in air pressure in the tire with high precision.

A slip factor calculating device according to the present invention is a device for calculating the slip factor of the driving tire in a vehicle on which a driving tire and a following tire are mounted, and is characterized by comprising the above-mentioned initial correction factor determining device, rotational velocity correcting means for correcting the output of the rotational velocity detecting means using the initial correction factor found by the initial correction factor determining device, and means for calculating the slip factor of the driving tire on the basis of the rotational velocities of the driving tire and the following tire which are corrected by the rotational velocity correcting means.

The slip factor is inherently represented by the degree of difference between the speed of the vehicle and the peripheral speed of the driving tire. On the other hand, the following tire hardly slips. Accordingly, the peripheral speed of the following tire can be considered to be equal to the speed of the vehicle. Consequently, the slip factor can be calculated on the basis of the rotational velocity of the driving tire and the rotational velocity of the following tire. Moreover, the difference between the rotational velocity of the driving tire and the rotational velocity of the following tire changes depending on the coefficient of friction of the road surface on which the vehicle is traveling. Therefore, irrespective of the coefficient of friction of the road surface on which the vehicle is traveling, the slip factor can be accurately calculated on the basis of the rotational velocity of the driving tire and the rotational velocity of the following tire after the correction.

As described in the foregoing, according to the present invention, the slip factor is found by a method faithfully conforming to the inherent definition of the slip factor. Consequently, the slip factor involves the effect of the coefficient of friction of the road surface. Therefore, irrespective of the friction coefficient at a road surface on which the vehicle travels, the slip factor can be accurately calculated. If the present invention is applied to a tire pressure drop detecting device described below, for example, therefore, the effect of the slip factor on detection of the drop in air pressure in the tire can be eliminated with high precision. Therefore, it is possible to detect the drop in air pressure in the tire with high precision.

A tire pressure drop detecting device according to the present invention is a device for detecting the drop in air pressure of a tire mounted on a vehicle, and is characterized by comprising the above-mentioned slip factor calculating device, lateral acceleration determining means for finding lateral acceleration exerted on the vehicle on the basis of the tire rotational velocity corrected by the rotational velocity correcting means, judged value determining means for substituting the corrected rotational velocity of the tire in a predetermined expression, to find a judged value, judged value correcting means for correcting the judged value found by the judged value determining means on the basis of the slip factor calculated by the slip factor calculating device and the lateral acceleration found by the lateral acceleration determining means, and means for detecting the drop in air pressure in the tire on the basis of the judged value corrected by the judged value correcting means.

In this construction, the judged value is corrected on the basis of the slip factor calculated by the slip factor calculating device and the lateral acceleration found by the lateral acceleration determining means. Consequently, the effect of the slip factor and the effect of load movement at the time of cornering can be eliminated from the judged value with high precision. As a result, it is possible to detect with high precision whether or not the air pressure in the tire has dropped.

The judged value correcting means for correcting the judged value may be one for subtracting the amount of the variation in a judged value found on the basis of a predetermined expression determined in consideration of the difference between the front axle weight and the rear axle weight from the judged value found by the judged value determining means, to correct the judged value.

In this construction, the amount of the variation in the judged value is found on the basis of a predetermined expression determined in consideration of the difference between the front axle weight and the rear axle weight. If the judged value is corrected using the amount of the variation in the judged value, therefore, it is possible to realize correction considering the difference between the amount of the load movement on the front tire side and the amount of the load movement on the rear tire side at the time of cornering.

According to the present invention, therefore, the judged value is corrected by the amount of the variation in the judged value found on the basis of the predetermined expression determined in consideration of the difference between the front axle weight and the rear axle weight. Consequently, it is possible to make a correction considering the difference between the amounts of the variations in the effective rolling radii of the front tire and the rear tire due to the relative difference between the front axle weight and the rear axle weight. Therefore, it is possible to detect the drop in air pressure in the tire with higher precision.

An example of an expression for finding the amount of the variation in the judged value may be one representing the amount of the variation in the judged value by the sum of the product of a first factor and the lateral acceleration found by the lateral acceleration determining means and the product of a second factor, the lateral acceleration found by the lateral acceleration determining means and the slip factor calculated by the slip factor calculating device.

In this case, an example of the first factor may be a factor determined by (a) sampling outputs of the judged value determining means and the lateral acceleration determining means in a case where the vehicle is caused to coast around a corner in a state where it is judged that the tires have normal internal pressure, and (b) finding as the first factor the slope of a linear expression approximating the relationship between the sampled judged value and the sampled lateral acceleration.

When the vehicle is caused to coast, the slip factor can be considered to be zero. In this case, the judged value is represented by the product of the lateral acceleration and the first factor. Consequently, the slope in the relationship between the judged value and the lateral acceleration, which are found when the vehicle is caused to coast around a corner, is a first factor.

The first factor is found by actually causing the vehicle to travel, whereby the actual state of the tire can be reflected in the first factor. Consequently, the actual state of the tire can be faithfully reflected in the correction of the judged value. Therefore, it is possible to detect the drop in air pressure in the tire with higher precision.

An example of the second factor may be a factor determined by (a) sampling outputs of the judged value determining means, the lateral acceleration determining means and the slip factor calculating device in a case where the vehicle is caused to corner while applying driving torque to the tires in a state where it is judged that the tires have normal internal pressure, (b) approximating the relationship between a value obtained by subtracting the product of the first factor and the sampled lateral acceleration subtracted from the sampled judged value and the product of the sampled lateral acceleration and the slip factor, by a linear expression, and (c) finding the slope of the linear expression as the second factor.

Also in this construction, the second factor is found by actually causing the vehicle to travel. Consequently, the actual state of the tire can be reflected in the second factor. Therefore, the actual state of the tire can be faithfully reflected in the correction of the judged value. Therefore, it is possible to detect the drop in air pressure in the tire with higher precision.

In this case, the first factor may be a factor determined by finding the first factor for each of a plurality of types of tires and then finding the average value thereof. Further, the second factor may be a factor determined by finding the second factor for each of the plurality of types of tires and finding the average value thereof.

The amount of the variation in the judged value differs depending on the type of tires. For example, it differs as between a studless tire and a summer tire (a normal tire), for example. For a newly provided tire which differs in type from the tire that had bee provided on the vehicle when the first factor or the like was found, it is to be expected that the correction of the judged value with high precision will be difficult.

In this construction, therefore, the first factor and the second factor are found for each type of tires. The average values of the plurality of first factors and the plurality of second factors which correspond to the found types of tires shall be respectively a final first factor and a final second factor. Regardless of the type of the tires provided on the vehicle, it is possible to make the correction with high precision.

According to the present invention, the factors determined in consideration of the fact that a plurality of types of tires can be mounted are respectively taken as a final first factor and a final second factor. Regardless of the type of tires provided on the vehicle, therefore, it is possible to detect the drop in air pressure in the tire with high precision.

Furthermore, the first factor may be a factor determined by finding the first factor for each of a plurality of types of load conditions and finding the average value thereof. Further, the second factor may be a factor determined by finding the second factor for each of a plurality of types of load conditions and finding the average value thereof.

The judged value varies depending on the amount of movement of the load on the vehicle, and the amount of the load movement differs depending on the total weight of the vehicle. That is, the judged value differs depending on load conditions such as the total weight of people in the vehicle and the live load. Therefore, when the vehicle travels under load conditions different from the load conditions under which the first factor or the like has been found, the correction of the judged value with high precision may, in some cases, be difficult.

In this construction, therefore, the first factor and the second factor are found for each load condition, and the average values of the found first factors and the found second factors, which correspond to the found conditions, shall be respectively a final first factor and a final second factor.

Therefore, it is possible to make the correction with high precision under any load conditions.

As described in the foregoing, according to the present invention, the factors determined in consideration of the fact that the load conditions such as the total weight of people in the vehicle can differ, are respectively taken as a final first factor and a final second factor. Therefore, it is possible to detect the drop in air pressure in the tire with high precision under any load conditions.

BRIEF DESCRIPTION OF THE DRAWINGS

FIG. 1 is a schematic block diagram showing the construction of a tire pressure drop detecting device to which one embodiment of the present invention is applied;

FIG. 4 is a diagram for explaining lateral acceleration exerted on a vehicle;

PREFERRED EMBODIMENTS FOR CARRYING OUT THE INVENTION

Embodiments of the present invention will be described in detail with reference to accompanying drawings.

FIG. 1 is a schematic block diagram showing the construction of a tire pressure drop detecting device to which one embodiment of the present invention is applied. The tire pressure drop detecting device detects whether or not the air pressure of any of four tires $W_1$, $W_2$, $W_3$, and $W_4$ provided on a four-wheel vehicle drops. The tires $W_1$ and $W_2$ respectively correspond to right and left front tires. The tires $W_3$ and $W_4$ respectively correspond to right and left rear tires.

A wheel speed sensor 1 is provided in relation to each of the tires $W_1$, $W_2$, $W_3$, and $W_4$. An output of the wheel speed sensor 1 is fed to a control unit 2.

A display 3 is connected to the control unit 2. The display 3 is for reporting the tire $W_i$ (i=1, 2, 3, 4) whose air pressure drops, and may be constituted by a liquid crystal display device, a plasma display device, a CRT (Cathode Ray Tube), or the like.

An initializing switch 4 is also connected to the control unit 2. The initializing switch 4 is operated by a user in calculating initial correction factors $K_j$ (j=1, 2, 3) for eliminating the effect of an initial difference between the tires $W_i$. The initial difference means variations in effective rolling radius within the production standard occurring among the tires $W_i$.

Figure 2:
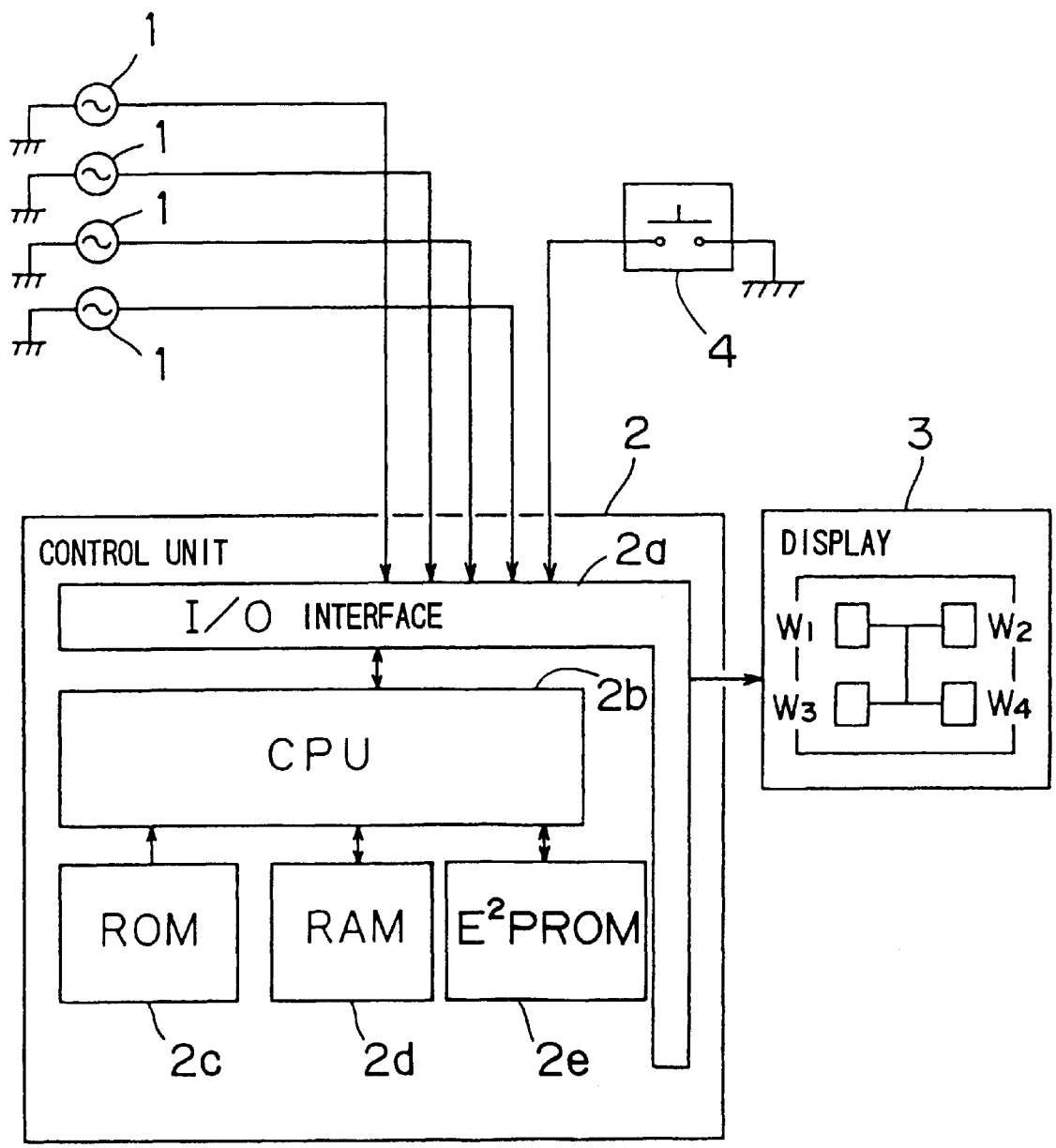
FIG. 2 is a block diagram showing the electrical construction of the tire pressure drop detecting device.

FIG. 2 is a block diagram showing the electrical construction of the tire pressure drop detecting device. The control unit 2 is constituted by a microcomputer including an I/O interface 2a, a CPU 2b, a ROM 2c, a RAM 2d, and an EEPROM ($E^2$PROM) 2e.

The I/O interface 2a is required to deliver signals to external devices such as the wheel speed sensors 1 and the initializing switch 4. The CPU 2b is for performing various operation processing in accordance with a control operation program stored in the ROM 2c. The RAM 2d is one to which data or the like is temporarily written when the CPU 2b performs a control operation and from which the written data or the like is read out. The EEPROM 2e is for storing the initial correction factors $K_j$.

The wheel speed sensor 1 outputs a pulse signal corresponding to the speed of rotation of the tire $W_i$ (hereinafter referred to as "wheel speed pulses"). In the CPU 2b, the rotational velocity $F_i$ of each of the tires $W_i$ is calculated for each predetermined sampling period $\Delta T$ (sec) (for example, $\Delta T=1$) on the basis of the wheel speed pulses outputted from the wheel speed sensor 1.

Figure 3:
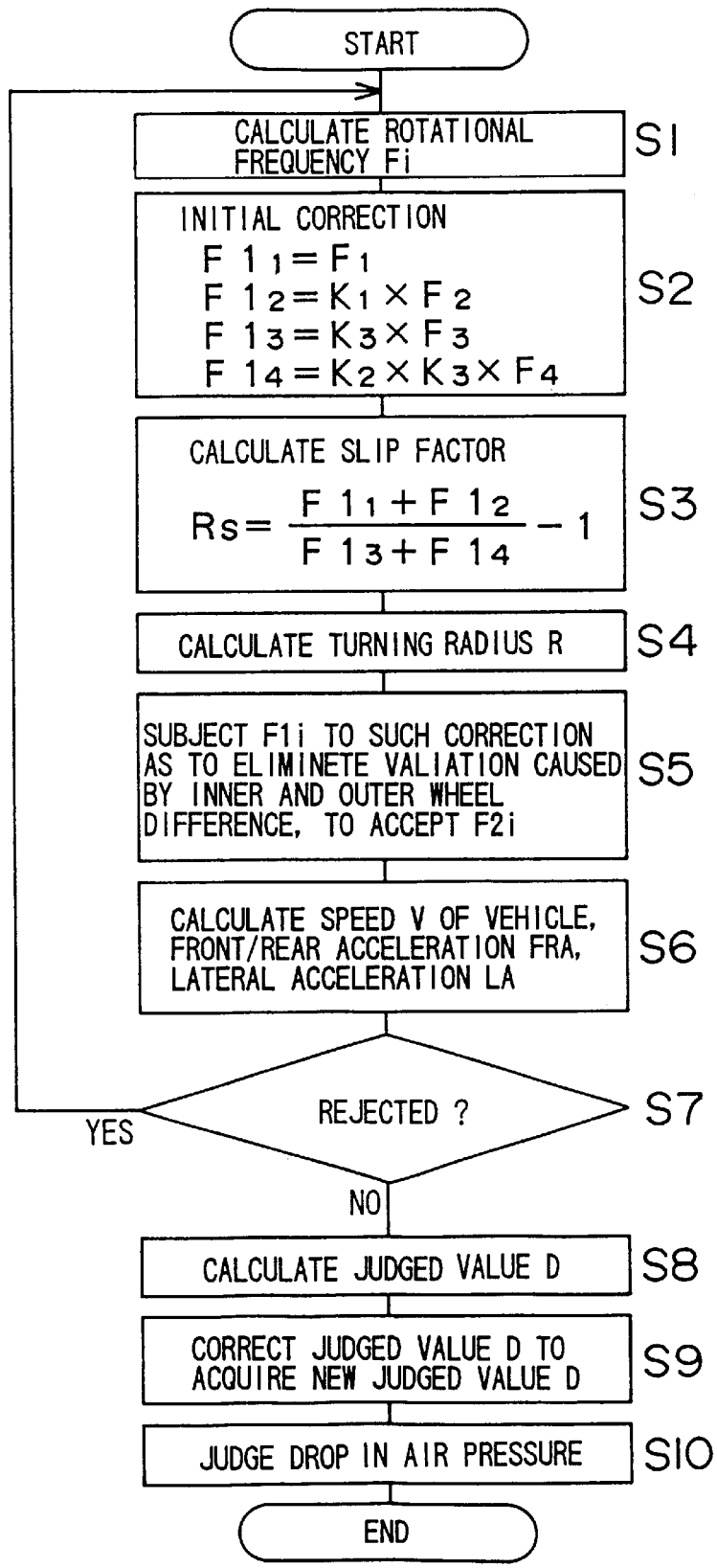
FIG. 3 is a flow chart for explaining the whole of processing for detecting the drop in air pressure of a tire.

FIG. 3 is a flow chart for explaining processing for detecting the air pressure of a tire in the tire pressure drop detecting device. The control unit 2 performs this processing by operation of the CPU 2b in accordance with the predetermined program stored in the ROM 2c. In the following description, it is presupposed that an objective vehicle is an FF vehicle.

In this processing, the rotational velocity $F_i$ of each of the tires $W_i$ is first calculated on the basis of the wheel speed pulses outputted from the wheel speed sensor 1 (step S1).

The tires $W_i$ are fabricated with initial differences, as described above. Consequently, the effective rolling radii of the respective tires $W_i$ are not necessarily the same even if all the tires $W_i$ have normal internal pressure. Therefore, the calculated rotational velocities $F_i$ of the tires $W_i$ vary. On the other hand, judgments as to whether the air pressure in the tire $W_i$ has dropped are made on the assumption that the rotational velocities $F_i$ of the respective tires $W_i$ are approximately equal in a case where all the tires $W_i$ have normal internal pressure. Consequently, the effect of the initial difference must be eliminated from the calculated rotational velocity $F_i$.

In order to eliminate the effect of the initial difference from the calculated rotational velocity $F_i$, the rotational velocity $F_i$ is subjected to initial correction (step S2). Specifically, correction is made according to the following equations (12) to (15):

$$F1_1 = F_1 \quad (12)$$

$$F1_2 = K_1 \times F_2 \quad (13)$$

$$F1_3 = K_3 \times F_3 \quad (14)$$

$$F1_4 = K_2 \times K_3 \times F_4 \quad (15)$$

The initial correction factor $K_1$ is for correcting the difference in effective rolling radius depending on the initial difference between the right and left front tires $W_1$ and $W_2$. The initial correction factor $K_2$ is for correcting the difference in effective rolling radius depending on the initial difference between the right and left rear tires $W_3$ and $W_4$. The initial correction factor $K_3$ is for correcting the difference in effective rolling radius depending on the initial difference between the front tire $W_1$ and the rear tires $W_3$ and $W_4$.

The initial correction factors $K_j$ are calculated in a case such as where the vehicle is first caused to travel, where the air pressure in the tire $W_i$ is supplemented, or where the tire $W_i$ is replaced, and are stored in the EEPROM 2e of the control unit 2.

One feature of the present embodiment is in the method of finding the initial correction factors $K_j$. Specifically, in the present embodiment, the initial correction factors $K_j$ faithfully representing only the difference in effective rolling radius among the tires $W_i$ depending on the initial difference are used. The details will be described later.

The cause of the variations among the rotational velocities $F_i$ of the tires $W_i$ is not only the initial differences. For example, the difference in the slip factor Rs between the right and left driving tires $W_1$ and $W_2$ in a case where the vehicle travels around a corner is also a cause.

For example, when the vehicle travels around a corner, lateral acceleration LA is exerted on the vehicle toward the outside of (away from) the corner, so that the load on the vehicle is moved toward the outside of (away from) the corner. As a result, the load applied to the tire at the inside of (nearer to) the corner (the inside tire) is relatively decreased, while the load applied to the tire at the outside of (farther from) the corner (the outside tire) is relatively increased. Consequently, the ground contact area of the inside tire is relatively decreased, while the ground contact area of the outside tire is relatively increased.

A driving force produced by the engine is almost equally applied to the inside tire and the outside tire by a differential gear. Consequently, when the vehicle turns the corner, a difference arises in the slip factor Rs as between the driving tires $W_1$ and $W_2$. As a result, even if all the tires $W_i$ have normal internal pressure, variations arise between the rotational velocity of the inside tire and the rotational velocity of the outside tire when the vehicle turns a corner.

In order to eliminate the effect of the slip factor Rs from the detection of the drop in air pressure, therefore, the slip factor Rs is calculated according to the following equation (16):

$$Rs = \frac{F1_1 + F1_2}{F1_3 + F1_4} - 1 \qquad (16)$$

The slip factor Rs is represented by the degree of difference between the speed V of the vehicle and the peripheral speed of each of the driving tires $W_1$ and $W_2$. On the other hand, the following tires $W_3$ and $E_4$ hardly slip, whereby the peripheral speed of each of the following tires $W_3$ and $W_4$ may be considered to be equal to the speed V of the vehicle. If the ratio of the difference between the rotational velocities $F1_1$ and $F1_2$ of the driving tires $W_1$ and $W_2$ and the rotational velocities $F1_3$ and $F1_4$ of the following tires $W_3$ and $W_4$ to the rotational velocities $F1_3$ and $F1_4$ of the following tires $W_3$ and $W_4$ which are used as a basis is found, it is possible to know to what extent the driving tires $W_1$ and $W_2$ slip. Accordingly, the slip factor Rs can be expressed by the following equation (17). It is clear that the foregoing equation (16) is derived if the equation (17) is changed:

$$Rs = \frac{(F1_1 + F1_2) - (F1_3 + F1_4)}{F1_3 + F1_4} \qquad (17)$$

The slip factor Rs is inversely proportional to the coefficient of friction $\mu$ of a road surface, as expressed by the foregoing equation (9). That is, the higher is the coefficient of friction $\mu$, the lower is the slip factor Rs, while the lower is the coefficient of friction $\mu$, the higher is the slip factor Rs.

As described in the foregoing, the slip factor Rs expressed by the foregoing equation (16) is found by a method faithfully conforming to the inherent definition of the slip factor. Consequently, the slip factor has already involved the effect of the coefficient of friction $\mu$ of the road surface. That is, if the coefficient of friction $\mu$ of the road surface is increased, the numerator in the foregoing equation (17) is decreased. Consequently, the slip factor Rs is decreased. On the other hand, if the coefficient of friction $\mu$ of the road surface is decreased, the numerator in the foregoing equation (17) is increased. Consequently, the slip factor Rs is increased.

If the slip factor Rs is thus found by the foregoing equation (16), the accurate slip factor Rs can be found irrespective of the coefficient of friction $\mu$ of the road surface.

The calculated slip factor Rs is stored once in the RAM 2d. The slip factor Rs is used in correcting the judged value D required to detect the drop in air pressure.

The slip factor Rs expressed by the foregoing equation (16) is calculated, assuming a case where the objective vehicle is an FF vehicle, as described above. If the objective vehicle is an FR vehicle, the slip factor Rs is calculated by the following equation (18):

$$Rs = \frac{F1_3 + F1_4}{F1_1 + F1_2} - 1 \qquad (18)$$

The difference between the distances of the tires on the inside of the corner and the tires on the outside of the corner from the turning center in a case where the vehicle corners is also a cause of the variations between the rotational velocities $F_i$ of the tires $W_i$. Further, the movement of the load on the vehicle is another cause of the variations between the rotational velocities $F_i$.

When the vehicle turns in a counterclockwise direction, for example, the turning radii of the tires $W_1$ and $W_3$ on the inside of the corner are relatively small, while the turning radii of the tires $W_2$ and $W_4$ on the outside of the corner are relatively large. Consequently, the rotational velocities $F_1$ and $F_3$ of the tires $W_1$ and $W_3$ on the inside of the corner are low, while the rotational velocities $F_2$ and F4 of the tires $W_2$ and $W_4$ on the outside of the corner are high. As a result, a difference necessarily arises between the rotational velocities of the right and left tires.

Furthermore, when the vehicle turns in a counterclockwise direction, for example, the lateral acceleration LA is exerted on the center of gravity O of the vehicle, as shown in FIG. 4. The lateral acceleration LA is inversely proportional to the turning radius R and is proportional to the square of the speed V of the vehicle, and is exerted toward the outside of the corner (toward the right side of the vehicle). As a result, the partial load on the vehicle which is proportional to the lateral acceleration LA is moved toward the outside of the corner from the inside of the corner. Correspondingly, the respective effective rolling radii of the following tires $W_3$ and $W_4$ vary by amounts expressed by the following expressions (19) and (20):

$$(1 + p \times LA) \qquad (19)$$

$$(1 - p \times LA), \qquad (20)$$

where p is a factor proportional to the load on the vehicle. When the load on the vehicle is considered to be constant, the factor p can be considered as a constant.

The effective rolling radius of the tire $W_i$ varies by the movement of the load on the vehicle, whereby variations arise between the rotational velocities of the right and left tires.

As shown in FIG. 3, a turning radius R whose variation caused by the movement of the load on the vehicle has been eliminated, is then calculated (step S4). More specifically, the speeds $V1_3$ and $V1_4$ of the following tires $W_3$ and $W_4$ are calculated by the following equations (21) and (22) on the basis of the rotational velocities $F1_3$ and $F1_4$ after the initial correction. In the following equations (21) and (22), r is a constant corresponding to the effective rolling radius at the time of linear travel, which is stored in the ROM $2c$.

$$V1_3 = 2\pi r \times F1_3 \qquad (21)$$

$$V1_4 = 2\pi r \times F1_4 \qquad (22)$$

The turning radius R' of the vehicle is then calculated by the following equation (23) on the basis of the calculated speeds $V1_3$ and $V1_4$ of the following tires $W_3$ and $W_4$. In the following equation (23), Tw is the tread width, that is, the distance between the right wheel and the left wheel:

$$R' = \frac{Tw}{2} \times \frac{V1_4 + V1_3}{V1_4 - V1_3} \qquad (23)$$

The calculated turning radius R' of the vehicle is subjected to such correction as to eliminate the effect on the rotational velocity of the movement of the load of the vehicle, as given by the following equation (24), to find a turning radius R after the correction. In the following equation (24), $u_1$ and $u_2$ are constants previously stored in the ROM $2c$:

$$R = R' \times \{(u_1 + u_2(V1_3 + V1_4)^2\} \qquad (24)$$

The following values are suitable as $u_1$ and $u_2$:

$$u_1 = 1$$

$$u_2 = \frac{1}{9.8} \times \frac{\beta}{2Tw}$$

$$\text{where } \beta = \frac{Q \times H \times \alpha}{Tw \times 100}$$

Q . . . the load on the vehicle

H . . . the height from the ground plane of the tire to the center of gravity of the vehicle α . . . the rate of variation in the effective rolling radius with respect to the load.

The rotational velocities $F1_i$ found in the foregoing step S2 are corrected in order to eliminate variations caused by a difference between the distances of the tires $W_i$ from the center of turning on the basis of the found turning radius R of the vehicle (step S5). Specifically, rotational velocities $F2_1$ to $F2_4$ after the correction are found by the following equations (25) to (28):

$$F2_1 = \frac{|R|}{\sqrt{\{(R - Tw/2)^2 + WB^2\}}} \times F1_1 \qquad (25)$$

$$F2_2 = \frac{|R|}{\sqrt{\{(R + Tw/2)^2 + WB^2\}}} \times F1_2 \qquad (26)$$

$$F2_3 = \frac{|R|}{|R - Tw/2|} \times F1_3 \qquad (27)$$

$$F2_4 = \frac{|R|}{|R + Tw/2|} \times F1_4 \qquad (28)$$

Consequently, the rotational velocities $F2_i$ in which variation caused by a difference between the distances of the tire $W_i$ on the inside of the corner and the tire $W_i$ on the outside of the corner from the center line of turning (hereinafter referred to as "an inner and outer wheel difference") has been eliminated, are acquired.

In the foregoing equations (25) to (28), WB denotes the wheel base of the vehicle.

The correction in the foregoing equations (25) to (28) is performed with processing that assumes that the objective vehicle is an FF vehicle, as described above. If the objective vehicle is an FR vehicle, the turning radius R' before the correction required to calculate the turning radius R is found on the basis of the speeds $V1_1$ and $V1_2$ of the front tires $W_1$ and $W_2$ which are following tires, after which the following equations (29) to (32) are applied:

$$F2_1 = \frac{|R|}{|R - Tw/2|} \times F1_1 \qquad (29)$$

$$F2_2 = \frac{|R|}{|R + Tw/2|} \times F1_2 \qquad (30)$$

$$F2_3 = \frac{|R|}{\sqrt{\{(R - Tw/2)^2 + WB^2\}}} \times F1_3 \qquad (31)$$

$$F2_4 = \frac{|R|}{\sqrt{\{(R + Tw/2)^2 + WB^2\}}} \times F1_4 \qquad (32)$$

The rotational velocity $F_i$ may, in some cases, include an error depending on the turning radius R of the vehicle, the speed V of the vehicle, the lateral acceleration LA of the vehicle, and the front/rear acceleration $FRA_i$ of each of the tires $W_i$.

Specifically, when the turning radius R is relatively small, the tire $W_i$ may slip laterally, whereby it is highly possible that the calculated rotational velocity $F_i$ includes an error. When the speed V of the vehicle is significantly low, the detection precision of the wheel speed sensor 1 is significantly degraded, whereby it is highly possible that the calculated rotational velocity $F_i$ includes an error.

Furthermore, when the lateral acceleration LA of the vehicle is relatively large, the tire $W_i$ may slip laterally, whereby it is highly possible that the calculated rotational velocity $F_i$ includes an error. Further, when the front/rear acceleration $FRA_i$ of each of the tires $W_i$ is relatively large, the effect of the slip of the tire $W_i$ due to rapid acceleration/rapid deceleration of the vehicle or the effect of a foot brake, is considered, whereby it is highly possible that the calculated rotational velocity $F_i$ includes an error.

When it is thus highly possible that the rotational velocity $F_i$ includes an error, it is preferable that the rotational velocity $F_i$ is rejected without being employed for detecting the drop in air pressure.

The speed V of the vehicle, the lateral acceleration LA of the vehicle, and the front/rear acceleration $FRA_i$ of each of the tires $W_i$ are then calculated (step S6). More specifically, the speed V of the vehicle is calculated on the basis of the speed $V2_i$ of each of the tires $W_i$. The speed $V2_i$ of each of the tires $W_i$ is calculated by the following equation (33):

$$V2_i = 2\pi r \times F2_i \qquad (33)$$

The speed V of the vehicle is calculated by the following equation (34) on the basis of the calculated speed $V2_i$ of each of the tires $W_i$:

$$V = (V2_1 + V2_2 + V2_3 + V2_4)/4 \qquad (34)$$

On the other hand, the lateral acceleration LA of the vehicle is calculated by the following equation (35) utilizing the calculated speed V of the vehicle:

$$LA = V^2/(R \times 9.8) \quad (35)$$

Furthermore, the front/rear acceleration $FRA_i$ of each of the tires $W_i$ is calculated by the following equation (36), letting $BV2_i$ be the speed of the tire $W_i$ which is calculated at the time point of previous sampling period $\Delta T$:

$$FRA_i = (V2_i - BV2_i)/(\Delta T \times 9.8) \quad (36)$$

9.8 is inserted in the denominator in the foregoing equations (35) and (36) in order to convert the lateral acceleration LA and the front/rear acceleration $FRA_i$ into G (gravity acceleration) units.

Furthermore, the speed V of the vehicle, the lateral acceleration LA of the vehicle, and the front/rear acceleration $FRA_i$ of each of the tires $W_i$ may be found by being directly detected using sensors.

It is judged whether or not the rotational velocity $F_i$ calculated at the time point of the current sampling is rejected on the basis of the turning radius R, the speed V of the vehicle, the front/rear acceleration $FRA_i$ of each of the tires $W_i$, and the lateral acceleration LA of the vehicle (step S7). Specifically, when any one of the following four conditions (1) to (4) is met, the rotational velocities $F_i$ are rejected:

(1) $|R| < R_{TH}$ (for example, $R_{TH} = 30$ (m))

(2) $V < V_{TH}$ (for example, $V_{TH} = 10$ (km/h))

(3) $MAX\{|FRA_i|\} > A_{TH}$ (for example, $A_{TH} = 0.1$ (g): g=9.8 m/sec$^2$)

(4) $|LA| > G_{TH}$ (for example, $G_{TH} = 0.4$ (g))

When the rotational velocity $F_i$ is not rejected as a result of the judgment in the step S7, the judged value D is calculated by the following equation (37) on the basis of the rotational velocities $F2_i$ acquired in the step S5 (step S8):

$$D = \frac{\frac{F2_1 + F2_4}{2} - \frac{F2_2 + F2_3}{2}}{\frac{F2_1 + F2_2 + F2_3 + F2_4}{4}} \times 100 \quad (37)$$

In calculating the speed V of the vehicle, the lateral acceleration LA of the vehicle and the front/rear acceleration $FRA_i$ of each of the tires $W_i$ in the step S6, the rotational velocities $F2_i$ which have been subjected to correction corresponding to the initial difference and the inner and outer wheel difference are used. On the other hand, the rotational velocity $F_i$ of the tire $W_i$ also varies depending on not only the initial difference and the inner and outer wheel difference, but also the lateral acceleration LA applied to the vehicle and the slip factor Rs.

Consequently, the effect of variation factors including the lateral acceleration LA applied to the vehicle and the slip factor Rs, is exerted on the judged value D found in the step S8.

The judged value D is then subjected to correction for eliminating the effect of the variation factors (step S9). Specifically, a corrected value C is found by the following equation (38). The corrected value C is subtracted from the judged value D, as expressed by the following equation (39). Consequently, a new judged value D' from which the effect of the variation factors has been eliminated is acquired:

$$C = A1 \times LA + A2 \times LA \times Rs \quad (38)$$

$$D' = D - C \quad (39)$$

In the foregoing equation (38), A1 and A2 are factors previously stored in the ROM 2c. The factors A1 and A2 are found upon a trial while traveling with each of the tires $W_i$ known to have normal internal pressure.

The reason why the judged value D' is a value from which the effect of the variation factors have been eliminated, will be described.

At the time of cornering, the lateral acceleration LA is exerted on the vehicle toward the outside of the corner. Correspondingly, the load movement proportional to the lateral acceleration LA occurs in the vehicle. As a result, the load applied to each of the tires $W_i$ varies. On the other hand, the front axle weight and the rear axle weight of the vehicle generally differ from each other. Consequently, the amount of the load movement supported by the front tires $W_1$ and $W_2$ and the amount of the load movement supported by the rear tires $W_3$ and $W_4$ at the time of cornering differ from each other. As a result, the amount of variation in the effective rolling radius of each of the front tires $W_1$ and $W_2$ and the amount of variation in the effective rolling radius of each of the rear tires $W_3$ and $W_4$ during cornering, differ from each other. Therefore, the judged value D varies.

The amount of the variation in the effective rolling radius is proportional to the lateral acceleration LA. Consequently, the variation in the judged value D is also proportional to the lateral acceleration LA. Therefore, it is possible to correct the amount of the variation in the judged value D by an proportional expression of the lateral acceleration LA.

If the load on each of the driving tires $W_i$ varies, the ground contact area thereof varies. Consequently, the slip factor of the driving tire $W_i$ on the inside of the corner and the slip factor of the driving tire $W_i$ on the outside of the corner, differ from each other. As a result, a difference arises between the rotational velocity $F_i$ of the driving tire $W_i$ on the inside of the corner and the rotational velocity $F_i$ of the driving tire $W_i$ on the outside of the corner. As a result, the judged value D varies.

The slip factor Rs is the average of the slip factors of the right and left driving tires $W_i$. The difference between the slip factor of the driving tire $W_i$ on the inside of the corner and the slip factor of the driving tire $W_i$ on the outside of the corner is proportional to the amount of the load movement during cornering. The amount of the load movement is proportional to the lateral acceleration LA. Accordingly, the amount of variation in the judged value D is proportional to the product of the average slip factor Rs of the right and left driving tires $W_i$ and the lateral acceleration LA representing the degree of the difference in the slip factor Rs between the right and left driving tires $W_i$. Accordingly, the amount of variation in the judged value D can be corrected by a proportional expression of the product of the lateral acceleration LA and the slip factor Rs.

Since the sum of the above-mentioned two variation factors is the amount of variation in the judged value D during travel, whereby the amount of variation in the judged value D can be removed by the sum of the lateral acceleration LA and the proportional expression of the product of the lateral acceleration LA and the slip factor Rs.

Furthermore, the corrected value C is found in consideration of the variation in the judged value D due to the difference between the front axle weight and the rear axle weight of the vehicle. Consequently, a relative difference between the front axle weight and the rear axle weight can be reflected in the correction of the judged value D. In other words, it is possible to make corrections that consider the difference between the amounts of the variation in the effective rolling radius of the front tire $W_i$ and the effective rolling radius of the rear tire $W_i$ due to the relative difference between the front axle weight and the rear axle weight.

Therefore, it is possible to detect the drop in air pressure in the tire with higher precision.

Methods of finding the factors A1 and A2 will be described in detail.

(1) Method of finding factor A1

At the time of a trial, the vehicle is caused to coast around a corner. Specifically, the vehicle is caused to corner in a state where a speed change gear is set in a neutral position. At this time, the driving tires $W_1$ and $W_2$ rotate inertially. That is, the slip factor Rs=0. As a result, the second term in the right side of the foregoing equation(38) becomes zero. Consequently, the judged value D found during trial coasting is expressed by the following equation (40) from the foregoing equations (38) and (39):

$$D=D'+C=D'+A1\times LA \quad (40)$$

That is, the judged value D is expressed by a linear expression of the lateral acceleration LA applied to the vehicle.

Figure 5:
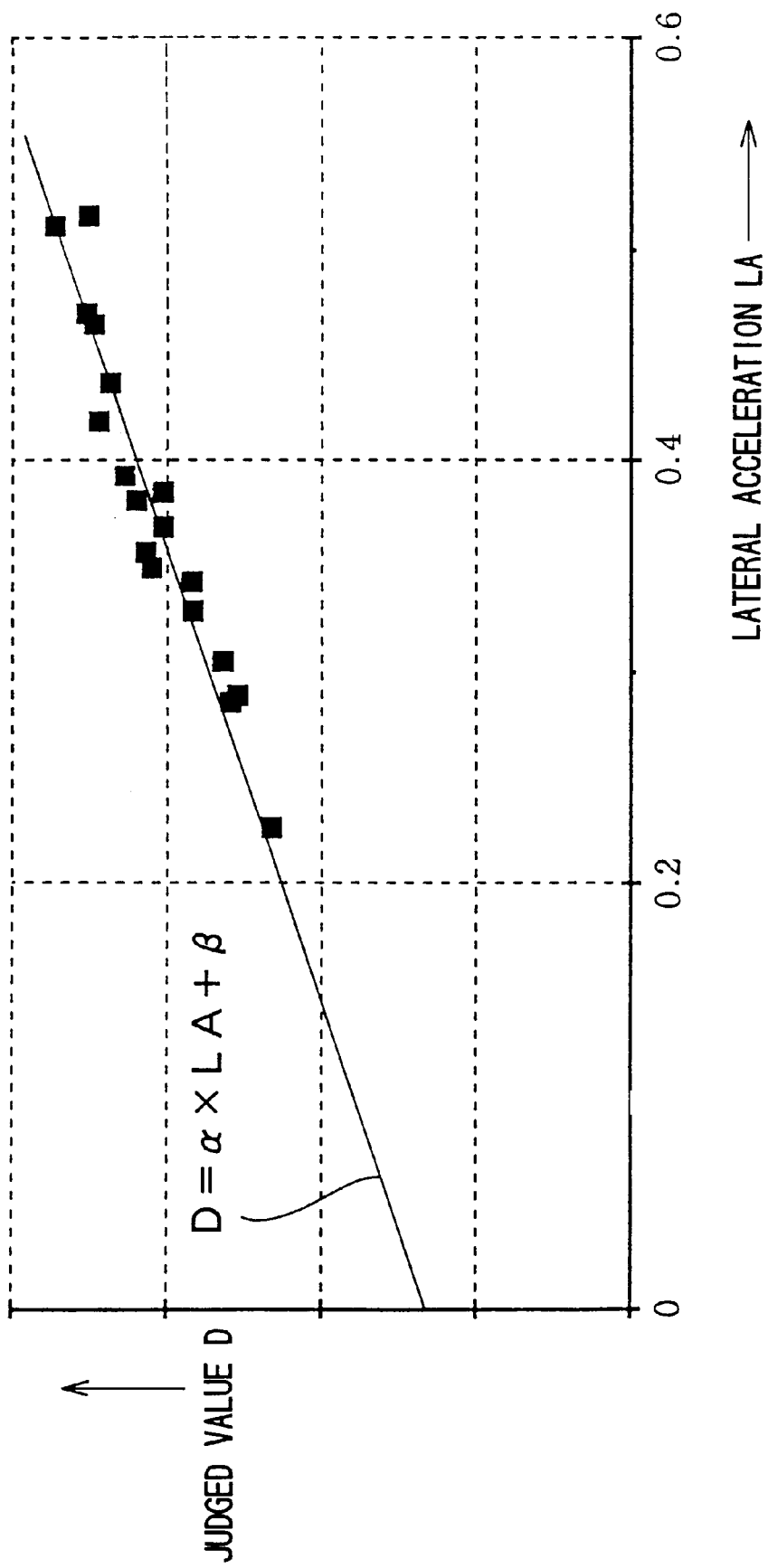
FIG. 5 is a diagram for explaining a method of finding a factor A1.

Therefore, the relationship between the lateral acceleration LA found during the trial and the judged value D found during the trial is approximated by the linear expression. Specifically, a graph respectively plotting the lateral acceleration LA and the judged value D on the horizontal axis and the vertical axis, is prepared as shown in FIG. 5. A method of least squares is then applied to the drawn graph. As a result, the following equation (41) is obtained:

$$D=\alpha\times LA+\beta \quad (41)$$

In the equation (41), a corresponds to A1.

(2) Method of finding factor A2

Figure 6:
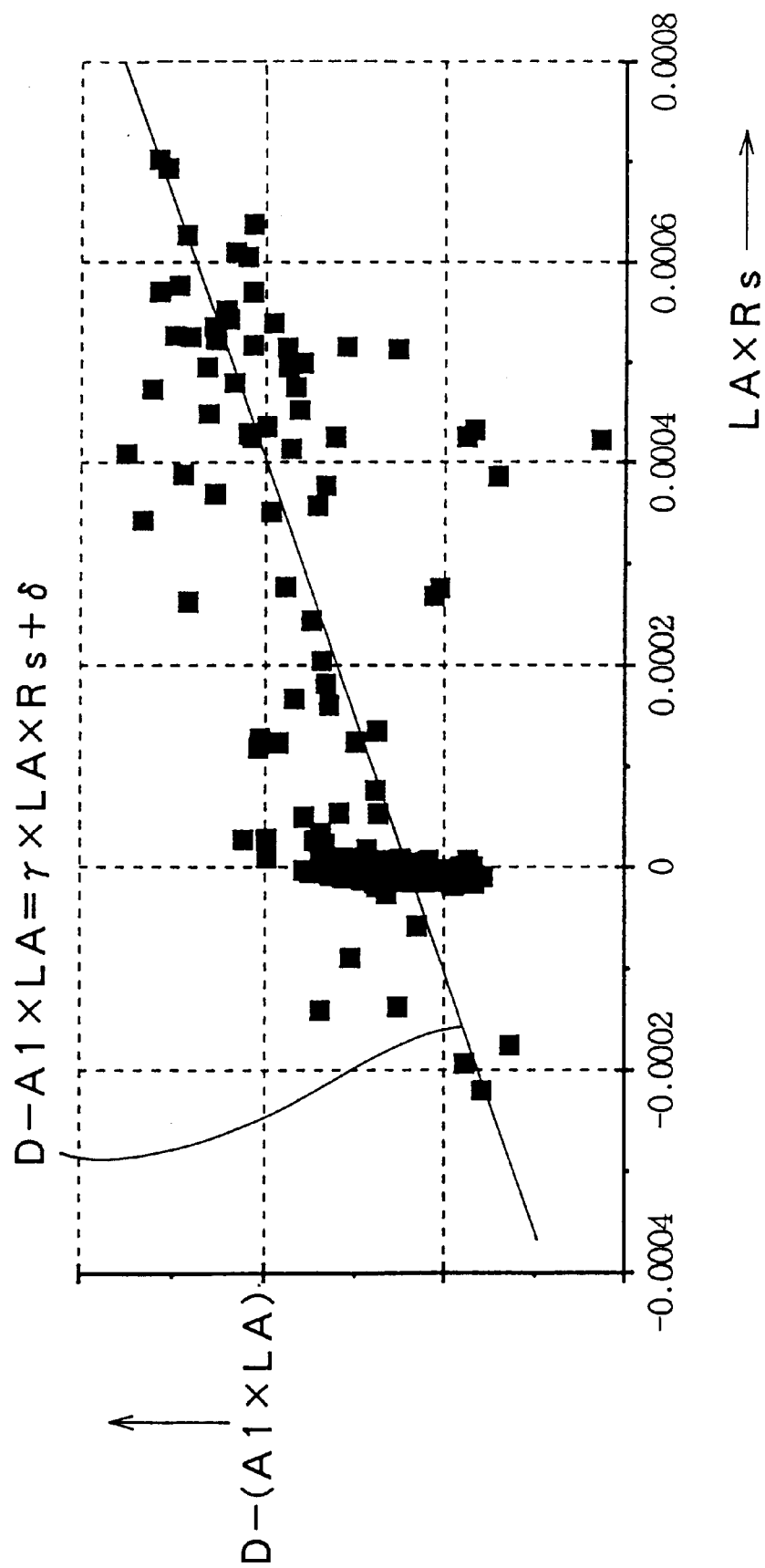
FIG. 6 is a diagram for explaining a method of finding a factor A2.

At the time of a trial, the vehicle is caused to travel while applying driving torque thereto. A graph shown in FIG. 6 is prepared utilizing the lateral acceleration LA, the judged value D and the slip factor Rs that are found at this time. A method of least squares then is applied to the drawn graph.

As a result, the following equation (42) is obtained:

$$D-A1\times LA=\gamma\times LA\times Rs+\delta \quad (42)$$

In the equation (42), $\gamma$ corresponds to A2.

The factors A1 and A2 are thus acquired by actually driving the vehicle. Consequently, the actual state of the tire $W_i$ can be faithfully reflected in the factors A1 and A2.

Returning to FIG. 3, in step S10, a judgment is made as to whether or not the air pressure has dropped in any of the tires $W_i$, on the basis of the judged value D' after the correction which is acquired in the step S9. Specifically, a judgment is made as to whether or not the judged value D' satisfies the following expression (43). In the following expression (43), $D_{TH1}=D_{TH2}=0.1$:

$$D'<-D_{TH1} \text{ or } D'>D_{TH2} \quad (43)$$

As a result, when the judged value D' is determined to satisfy the foregoing expression (43), the air pressure is judged to have dropped in one of the tires $W_i$. On the other hand, when the judged value D' does not satisfy the foregoing expression (43), a judgment is made that the air pressure has not dropped in any tire $W_i$.

Thus, a judgment is made while the vehicle is traveling as to whether or not the air pressure any of the tire $W_i$ has dropped. On the other hand, it is easier to understand for a driver to report that the air pressure has dropped in a particular tire $W_i$ than merely to report that the air pressure in some unspecified one of the tires $W_i$ has dropped. Therefore, the particular tire $W_i$ whose air pressure has dropped is specified.

By using the judged value D' found by the foregoing equation (40), the following can be specified:

If D'>0, the reduced pressure tire is $W_1$ or $W_4$.

If D'<0, the reduced pressure tire is $W_2$ or $W_3$.

Furthermore, in this case, if the vehicle is traveling linearly, the following can be specified:

If $F2_1>F2_2$, the reduced pressure tire is $W_1$.

If $F2_1<F2_2$, the reduced pressure tire is $W_2$.

If $F2_3>F2_4$, the reduced pressure tire is $W_3$.

If $F2_3<F2_4$, the reduced pressure tire is $W_4$.

If the tire $W_i$ whose air pressure has dropped is specified, the result is displayed upon being outputted to the display 3. The display 3 comprises indicator lamps respectively corresponding to the four tires $W_1$, $W_2$, $W_3$, and $W_4$, as shown in FIG. 2, for example. When it is judged that the air pressure in any one of the tires has dropped, the indicator lamp corresponding to the reduced pressure tire is turned on.

Figure 7:
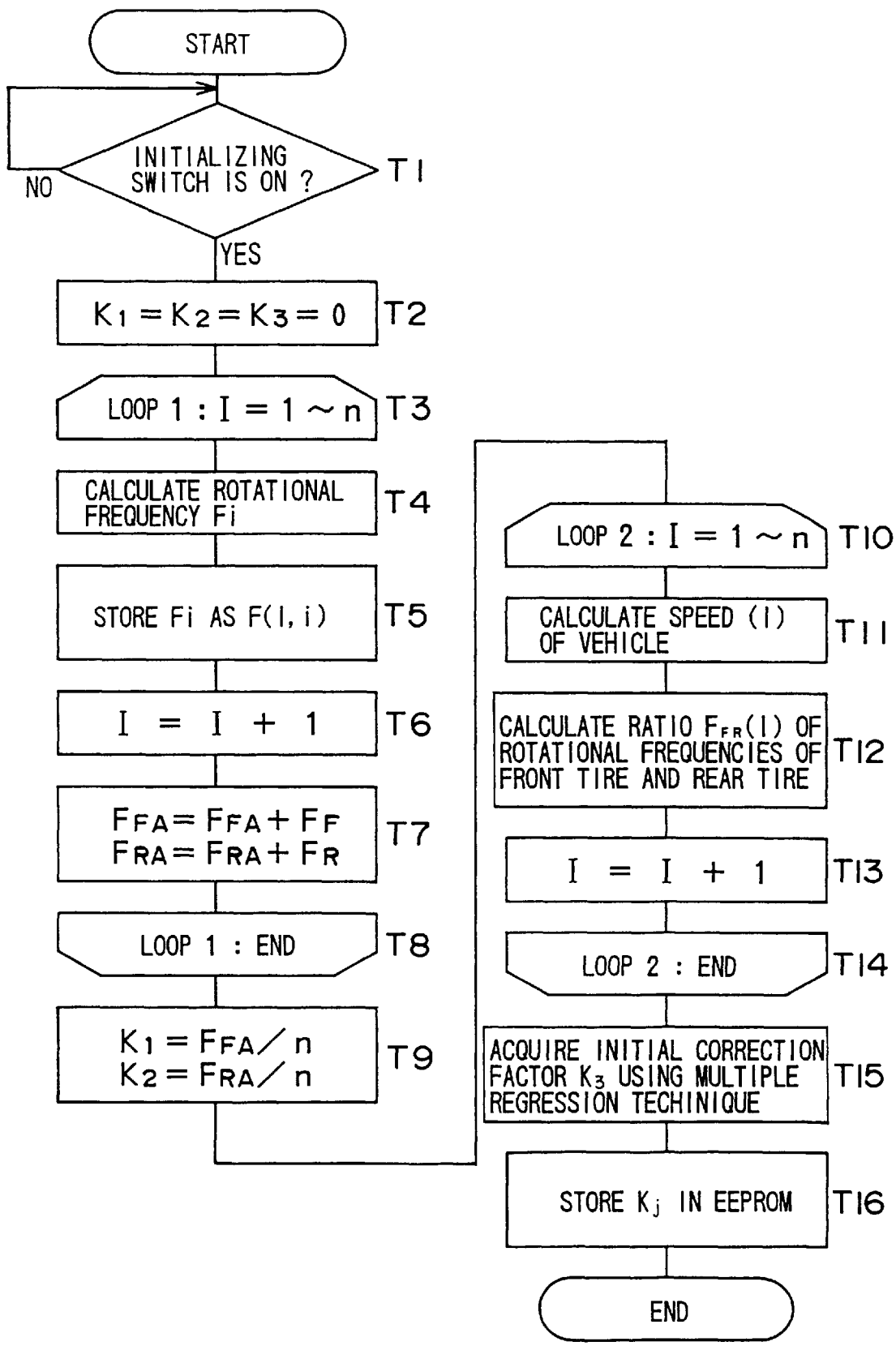
FIG. 7 is a flow chart for explaining processing for determining an initial correction factor.

FIG. 7 is a flow chart for explaining processing for finding the initial correction factors $K_j$. Processing for determining the initial correction factors $K_j$ is performed by the control unit 2.

To find the initial correction factors $K_j$, the driver operates the initializing switch 4 after confirming that the vehicle is linearly coasting. Coasting is traveling in a state where the change speed gear provided in the vehicle is set to a neutral mode. In this case, no driving torque and braking torque are applied to a driving tire to which the driving force produced by the engine is transmitted. The initializing switch 4 is operated in such a state.

Means capable of detecting the direction of travel of each of the tires $W_i$, the state in which the change speed gear has been set, and whether or not the foot brake is applied, may be provided to allow the operation of the initializing switch 4 only when each of the means satisfies certain predetermined conditions. The following are the predetermined conditions: the tire $W_i$ is approximately parallel to the direction of travel of the vehicle, the change speed gear is set in a neutral mode, and the foot brake is not applied, that is, the vehicle is linearly coasting. According to this construction, it is possible to prevent an operation to determine the initial correction factors $K_j$ from being executed, when the vehicle is not linearly coasting.

The control unit 2 judges whether or not the initializing switch 4 has been actuated (step T1). As a result, if it is judged that the initializing switch 4 is actuated, the initial correction factors $K_j$ are first cleared (step T2). Thereafter, processing in the subsequent steps T4 through T7 is repeatedly performed until I=n (steps T3 to T8).

Specifically, the wheel speed pulses outputted from the wheel speed sensor 1 are accepted, and the rotational velocity $F_i$ of each of the tires $W_i$ is calculated on the basis of the accepted wheel speed pulses (step T4). Thereafter, the calculated rotational velocities $F_i$ are stored as F(I, i) in the RAM 2d (step T5). I is incremented by "1" (step T6). Thereafter, the ratio $F_F$ of the rotational velocities of the right and left front tires $W_1$ and $W_2$ and the ratio $F_R$ of the rotational velocities of the right and left rear tires $W_3$ and $W_4$, are calculated, and the calculated ratios $F_F$ and $F_R$ are respectively cumulatively added (step T7). Specifically, the ratios $F_F$ and $F_R$ of the rotational velocities are added to the previous results of addition $F_{FA}$ and $F_{RA}$, to find new results of addition $F_{FA}$ and $F_{RA}$.

The ratios $F_F$ and $F_R$ of the rotational velocities are calculated in accordance with the following equations (44) and (45):

$$F_F = F_1/F_2 \quad (44)$$

$$F_R = F_3/F_4 \quad (45)$$

As a result of the foregoing, the results of addition $F_{FA}$ and $F_{RA}$ of n ratios $F_F$ and $F_R$ of rotational velocities are acquired. The respective average values of the results of addition $F_{FA}$ and $F_{RA}$ are calculated by the following equations (46) and (47) (step T9). The calculated average values are respectively taken as initial correction factors $K_1$ and $K_2$.

$$K_1 = F_{FA}/n \quad (46)$$

$$K_2 = F_{RA}/n \quad (47)$$

When the initial correction factors $K_1$ and $K_2$ are calculated, an initial correction factor $K_3$ is then found. Specifically, processing in the steps T11 to T13 is repeatedly performed until I=n (steps T10 to T14).

Specifically, the speed V(I) of the vehicle is first calculated by the following equation (48) on the basis of the rotational velocity F(I, i) of each of the tires $W_i$ stored in the RAM 2$d$ in the step T5 and the initial correction factors $K_1$ and $K_2$ acquired as described above (step T11). Consequently, the speed V(I) of the vehicle at the time of each sampling is calculated:

$$V(I) = 2\pi r \times \frac{F(I,1) + F(I,2) \times K_1 + F(I,3) + F(I,4) \times K_2}{4} \quad (48)$$

The ratio $F_{FR}(I)$ of the rotational velocities of the front tire and the rear tire at the time of each sampling is found by the following equation (49) on the basis of the rotational velocity F(I,i) of each of the tires $W_i$ stored in the RAM 2$d$ in the step T5 and the initial correction factors $K_1$ and $K_2$ acquired as described above (step T12):

$$F_{FR}(I) = \frac{F(I,1) + F(I,2) \times K_1}{F(I,3) + F(I,4) \times K_2} \quad (49)$$

Thereafter, I is incremented by "1" (step T13).

As a result of the foregoing, n correspondences between the speed V(I) of the vehicle and the ratio $F_{FR}(I)$ of the rotational velocities are acquired. The correspondences are graphically represented by way of example in FIG. 8.

Figure 8:
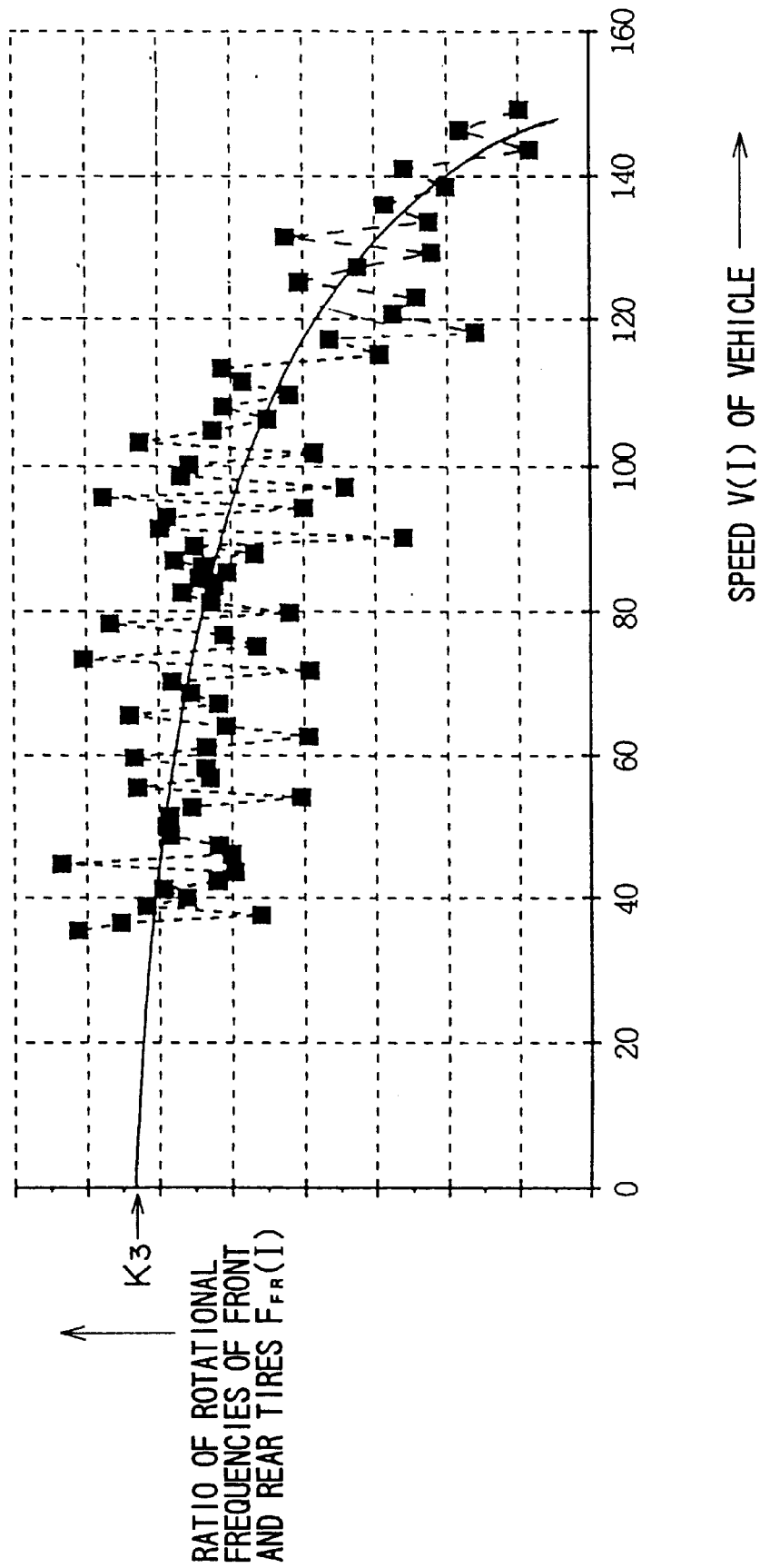
FIG. 8 is a diagram showing a correspondence between the speed of a vehicle and the ratio of the rotational velocities of a front tire and a rear tire at the time of linear coasting for finding an initial correction factor $K_3$.

As is apparent from FIG. 8, the ratio $F_{FR}(I)$ of the rotational velocities is not constant but differs depending on the speed V(I) of the vehicle. This means that the driving tire slips slightly. Specifically, even when the vehicle is linearly coasting, the effect of the slip factor Rs is included in the rotational velocities F(I,i).

On the other hand, when the speed V(I) of the vehicle is zero, the driving tire does not slip. That is, the slip factor Rs=0. Consequently, the ratio $F_{FR}(I)$ of the rotational velocities corresponding to V(I)=0 is hardly affected by the slip factor Rs.

Therefore, the ratio $F_{FR}(I)$ of the rotational velocities in the case of V(I)=0 is presumed using a predetermined multiple regression technique (step T15). The presumed ratio $F_{FR}(I)$ of the rotational velocities is taken as an initial correction factor $K_3$, and is stored in the EEPROM 2$e$ (step T16).

As described in the foregoing, the initial correction factors $K_j$ shall be found at the time of linear coasting when the effect of the slip factor is not exerted on the rotational velocities $F_i$. Consequently, initial correction factors $K_j$ faithfully representing only the relative differences in effective rolling radius between the tires $W_I$, without depending on the state of the road surface, can be found. Therefore, the rotational velocities $F1_i$ can be corrected using initial correction factors $K_j$ whose initial differences have been eliminated with high precision.

Although description has been made of one embodiment of the present invention, the present invention is not limited to the above-mentioned embodiment. Although in the above-mentioned embodiment, the initial correction factor $K_3$ is found using the multiple regression technique, the initial correction factor $K_3$ may, for example, be found by finding the average of the ratios of the rotational velocities of the front and rear tires. Specifically, the processing in the steps T10 to T15 shown in FIG. 7 may be replaced with the processing in the steps U1 to U5 shown in FIG. 9.

Figure 9:
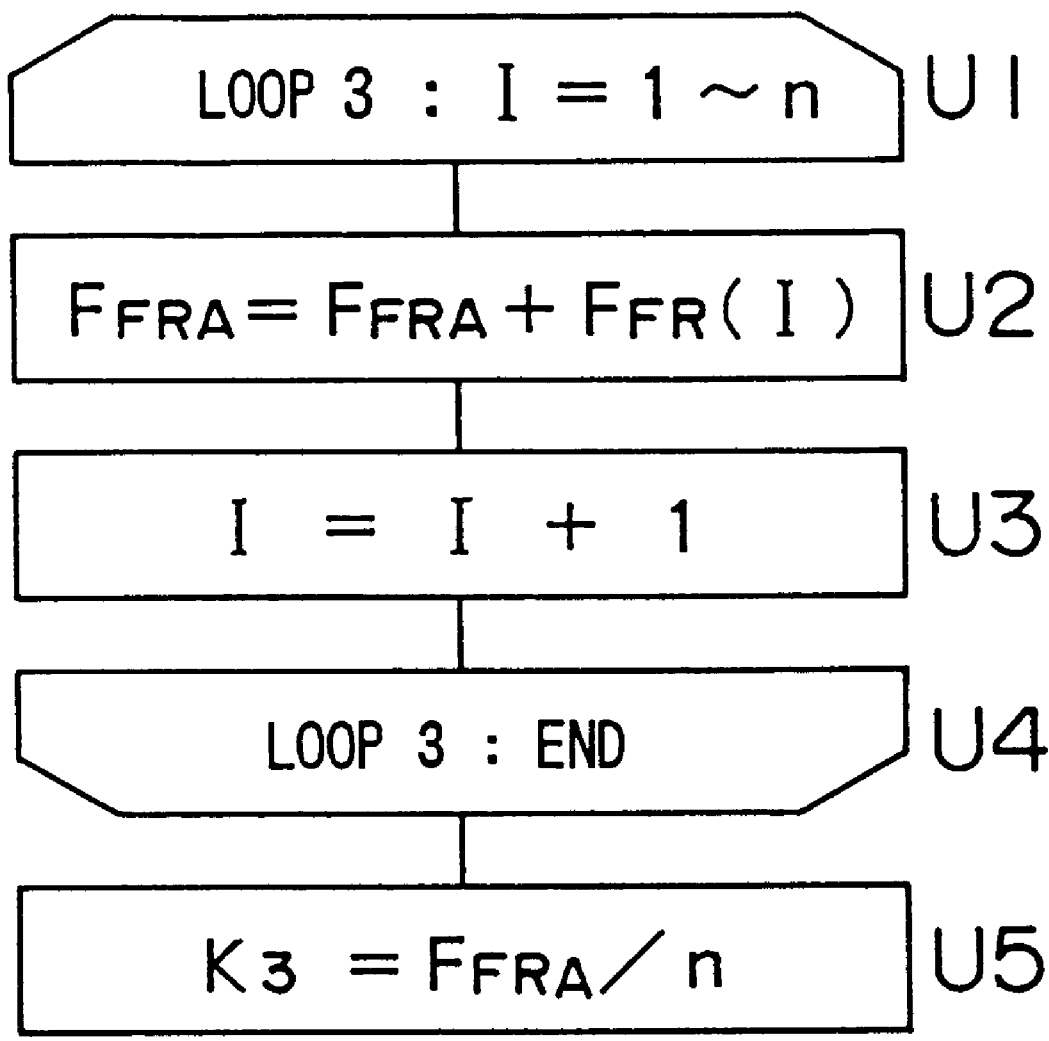
FIG. 9 is a flow chart for explaining another embodiment of a method of finding an initial correction factor $K_3$.

In FIG. 9, the processing in the steps U2 and U3 is repeatedly performed until I=n. The ratio $F_{FR}(I)$ of the rotational velocities of the front tire and the rear tire is first found in accordance with the foregoing equation (49). Thereafter, the ratio $F_{FR}(I)$ of the rotational velocities is cumulatively added (step U2). Specifically, the ratio $F_{FR}(I)$ of the rotational velocities is added to the previous result of addition $F_{FRA}$, to find a new result of addition $F_{FRA}$. Thereafter, I is incremented by "1" (step U3).

As a result of the foregoing, the results of addition $F_{FRA}$ of n ratios $F_{FR}(I)$ of the rotational velocities is acquired. The average value of the results of addition $F_{FRA}$ is calculated by the following equation (50) (step U5). The calculated average value is taken as the initial correction factor $K_3$:

$$K_3 = F_{FRA}/n \quad (50)$$

According to this construction, the initial correction factor $K_3$ can be found more simply, as compared with that using the multiple regression technique. Therefore, it is possible to shorten the overall time for determining the initial correction factors $K_j$.

Although in the above-mentioned embodiment, the type of the tires $W_i$ is not referred to, the amount of the variation $\Delta D$ of the judged value D differs depending on the type of the tires $W_i$. Specifically, the slip factor Rs differs if the shearing modulus $C_X$ differs even in a case where the driving/braking torque T applied to the tires $W_i$ and the coefficient of friction p of the road surface are respectively the same, as expressed by the foregoing equation (9). Further, the amount of variation in the effective rolling radius of each of the tires $W_i$ with respect to the load movement differs depending on the type of the tires $W_i$. Consequently, it is preferable to correct the judged value D using a corrected value C which is determined taking into consideration that a plurality of types of tires can be mounted.

Therefore, the factors A1 and A2 may be found in consideration of the fact that a plurality of types of tires can be mounted. Specifically, the factors A1 and A2 are found in the above-mentioned method in a state where four tires $W_i$ of the same type are mounted on the vehicle. Similarly, the factors A1 and A2 are found in a state where four tires $W_i$ of another type are mounted on the vehicle. The average values of the found factors A1 and A2 of the tires $W_i$ of each of the types is found. The found average values of the factors A1 and A2 are employed in calculating the corrected value C.

The type of the tires $W_i$ can be generally classified into a studless winter tire and a summer tire (a normal tire). The factors A1 and A2 are found with respect to each of the studless winter tire and the summer tire, and the average values thereof are employed in calculating the corrected value C. Consequently, it is possible to obtain the corrected value C evenly applicable to any tires $W_i$. Therefore, a drop in air pressure can be detected with high precision irrespective of the type of tires $W_i$ mounted on the vehicle.

Furthermore, the amount of the variation $\Delta D$ in the judged value D varies depending on not only the type of the tires $W_i$ but also the total weight of the vehicle. Specifically, the amount of the variation $\Delta D$ in the judged value D varies depending on load conditions such as the total weight of people in the vehicle and the live load. Consequently, it is preferable to correct the judged value D using the corrected value C considering that the total weight of the vehicle can differ.

Therefore, the factors A1 and A2 may be found taking into consideration the fact that the total weight of the vehicle can differ. Specifically, the factors A1 and A2 are found by changing the load conditions, such as the total weight of people on the vehicle and the live load, into a plurality of patterns which differ from each other. The average values of the found factors A1 and A2 are found, and the average values of the factors A1 and A2 are employed in calculating the corrected value C. Consequently, it is possible to obtain the corrected value C evenly effective under any load conditions. Therefore, the drop in air pressure can be detected with high precision under all load conditions.

Furthermore, although in the above-mentioned embodiment, description is made of a case where the initial correction factors $K_j$ are used for the tire pressure drop detecting device, the initial correction factors $K_j$ also can be used for another system utilizing the rotational velocities $F_i$ of tires $W_i$, for example, an antilock brake system (ABS) or a vehicle navigation system.

Although in the above-mentioned embodiment, description is made of a case where the slip factor Rs is used for the tire pressure drop detecting device, the slip factor Rs also may be used for antilock brake control, for example.

In addition thereto, various design changes can be made within the scope of technical matters as set forth in claims.

INDUSTRIAL APPLICABILITY

As described in the foregoing, the initial correction factor determining device, the slip factor calculating device, and the tire pressure drop detecting device according to the present invention are suitable for accurate detection of a drop in the air pressure in any one of the tires mounted on a vehicle.

I claim:

1. A tire pressure drop detecting device for detecting drops in air pressure in a tires mounted on a vehicle, the tires including a driving tire and a following tire, the vehicle having a rotational velocity detector which detects, and provides an output indicative of the rotational velocities of the mounted tires, comprising:

a slip factor calculating device, including
    an initial correction factor calculating device having
        means for accepting the output of said rotational velocity detector in a case where the vehicle is linearly coasting, and
        means for finding an initial correction factor for eliminating an effect of a relative difference in effective rolling radius depending on an initial difference among the mounted tires, on the rotational velocities, based on the accepted output of the rotational velocity detector,
    rotational velocity correcting means for correcting the accepted output of the rotational velocity detector, using the initial correction factor found by the initial correction factor calculating device, to determine corrected rotational velocities of the tires, and means for calculating a slip factor of the driving tire based on the corrected rotational velocities of the driving tire and the following tire;

lateral acceleration determining means for determining a lateral acceleration exerted on the vehicle based on the corrected rotational velocities of the tires;

substituting means for substituting the corrected rotational velocities of the tires in a predetermined expression, to determine an initial judged value;

judged value correcting means for correcting the determined initial judged value based on the calculated slip factor and the determined lateral acceleration, to obtain a corrected judged value; and means for detecting a drop in air pressure in one of the tires based on the corrected judged value.

2. A tire pressure drop detecting device according to claim 1, wherein the predetermined expression into which the corrected rotational velocities of the tires is substituted by said substituting mean is a first predetermined expression, and wherein said judged value correcting means finds an amount of a variation in the determined initial judged value based on a second predetermined expression determined in consideration of a difference between a front axle weight and a rear axle weight of the vehicle, and subtracts the found amount of variation from the initial judged value to obtain the corrected judged value.

3. A tire pressure drop detecting device according to claim 2, wherein the second predetermined expression represents the amount of variation in the initial judged value as a sum of a product of a first factor and the lateral acceleration found by said lateral acceleration determining means and a product of a second factor, the lateral acceleration found by said lateral acceleration determining means and the slip factor calculated by said slip factor calculating device.

4. A tire pressure drop detecting device according to claim 3, wherein the first factor is set by
    (a) sampling the output of said substituting means and said lateral acceleration determining means while the vehicle is coasting around a corner and the tires are judged to have normal internal pressure, and
    (b) finding as the first factor a slope of a linear expression approximating a relationship between the sampled output of said substituting means and the sampled lateral acceleration.

5. A tire pressure drop detecting device according to claim 3, wherein the second factor is a factor set by
    (a) sampling the output of said substituting means, said lateral acceleration determining means and said slip factor calculating device while the vehicle is concurrently cornering and applying driving torque to the tires and the tires are judged to that have normal internal pressure,
    (b) approximating a relationship between a value obtained by subtracting a product of the first factor and the sampled lateral acceleration from the sampled output of said substituting means and a product of the sampled lateral acceleration and the slip factor, by a linear expression, and
    (c) finding a slope of the linear expression as the second factor.

6. A tire pressure drop detecting device according to claim 3, wherein the first and second factors are respectively final first and second factors set by
    setting preliminary factors for each of a plurality of different types of tires mounted on the vehicle, including, for each type of tire, (a) obtaining a preliminary first factor, (b) sampling outputs of said substituting means, said lateral acceleration determining means and said slip factor calculating device while the vehicle is concurrently cornering and applying driving torque to the tires and the tires are judged to that have normal internal pressure, (c) approximating a relationship between a value obtained by subtracting a product of the preliminary first factor and the sampled lateral acceleration from the sampled judged value and a product of the sampled lateral acceleration and the slip factor, by a linear expression, and (d) finding a slope of the linear expression as a preliminary second factor;

finding the final first factor as an average of the found preliminary first factors; and finding the final second factor as an average of the found preliminary second factors.

7. A tire pressure drop detecting device according to claim 5, wherein the first and second factors are respectively final first and second factors set by setting preliminary factors for each of a plurality of different types of load conditions on the mounted on the vehicle, including, for each type of load condition, (a) obtaining a preliminary first factor, (b) sampling the output of said substituting means, said lateral acceleration determining means and said slip factor calculating device while the vehicle is concurrently cornering and applying driving torque to the tires and the tires are judged to that have normal internal pressure, (c) approximating a relationship between a value obtained by subtracting a product of the preliminary first factor and the sampled lateral acceleration from the sampled output of said substituting means and a product of the sampled lateral acceleration and the slip factor, by a linear expression, and (d) finding a slope of the linear expression as a preliminary second factor;

finding the final first factor as an average of the found preliminary first factors; and finding the final second factor as an average of the found preliminary second factors.

8. A tire pressure drop detecting device according to claim 3, wherein the first and second factors are final first and second factors set by setting preliminary factors for each of a plurality of different types of tires mounted on the vehicle, including, for each type of tire, (a) sampling the output of said substituting means and said lateral acceleration determining means while the vehicle is coasting around a corner and the tires are judged to have normal internal pressure, (b) finding as a preliminary first factor a slope of a linear expression approximating a relationship between the sampled output of said substituting means and the sampled lateral acceleration, (c) sampling the output of said substituting means, said lateral acceleration determining means and said slip factor calculating device while the vehicle is concurrently cornering and applying driving torque to the tires and the tires are judged to that have normal internal pressure, (d) approximating a relationship between a value obtained by subtracting a product of the preliminary first factor and the sampled lateral acceleration from the sampled output of said substituting means and a product of the sampled lateral acceleration and the slip factor, by a linear expression, and (e) finding a slope of the linear expression as a preliminary second factor;

finding the final first factor as an average of the found preliminary first factors; and finding the final second factor as an average of the found preliminary second factors.

9. A tire pressure drop detecting device according to claim 3, wherein the first and second factors are final first and second factors set by setting preliminary factors for each of a plurality of different types of load conditions on the mounted on the vehicle, including, for each type of load condition, (a) sampling the output of said substituting means and said lateral acceleration determining means while the vehicle is coasting around a corner and the tires are judged to have normal internal pressure, and (b) finding as a preliminary first factor a slope of a linear expression approximating a relationship between the sampled output of said substituting means and the sampled lateral acceleration;

(c) sampling the output of said substituting means, said lateral acceleration determining means and said slip factor calculating device while the vehicle is concurrently cornering and applying driving torque to the tires and the tires are judged to that have normal internal pressure, (d) approximating a relationship between a value obtained by subtracting a product of the preliminary first factor and the sampled lateral acceleration from the sampled output of said substituting means and a product of the sampled lateral acceleration and the slip factor, by a linear expression, and (e) finding a slope of the linear expression as a second preliminary factor;

finding the final first factor as an average of the found preliminary first factors; and finding the final second factor as an average of the found preliminary second factors.

* * * * *